March 6, 1956  G. R. SPRAGUE ET AL  2,737,503
METHOD OF MAKING AN EXPANDED OR CELLULAR
POLYVINYL CHLORIDE COMPOSITION
Filed Nov. 17, 1950
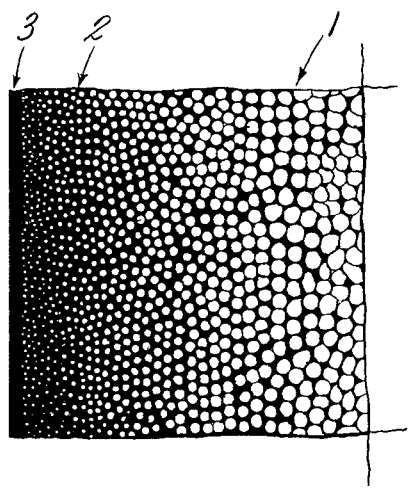
INVENTORS.
GEORGE R. SPRAGUE &
FRANK M. SCANTLEBURY, JR.
BY
Campbell, Brumbaugh Free Grover
Their ATTORNEYS.

United States Patent Office 2,737,503
Patented Mar. 6, 1956

2,737,503

METHOD OF MAKING AN EXPANDED OR CELLULAR POLYVINYL CHLORIDE COMPOSITION

George R. Sprague, Shelton, and Frank M. Scantlebury, Jr., Woodbridge, Conn., assignors, by mesne assignments, to The B. F. Goodrich Company, Akron, Ohio, a corporation of New York Application November 17, 1950, Serial No. 196,131

8 Claims. (Cl. 260—2.5)

This invention relates to a method of producing expanded or cellular polyvinyl chloride and to the resulting product.

It has been proposed heretofore to prepare expanded or cellular plastics having a low specific gravity or apparent density, and various methods have been proposed for introducing the voids into the plastic to form the characteristic cellular construction. A number of plastic materials have been suggested for use in such processes, but the suitability of the methods seems to vary with different plastics.

Polyvinyl chloride is a desirable plastic because of its chemical stability and desirable physical properties, but notable progress has not been made in forming it into a satisfactory cellular product. One process which has been proposed, for example, consists in mixing polyvinyl chloride with tricresyl phosphate and "Porofor N," an agent which liberates nitrogen upon heating. The mixture is placed in a mold and heated to a temperature at which the "Porofor N" decomposes and the polyvinyl chloride is gelled. An examination of the product made by this process shows that the cells generally extend to or into the surface of the molded object so that it does not have an outer skin of the plastic material. Rather, the surface of the molded object is more analogous to the surface that would result from cutting a section through the molded material. Such a product leaves considerable to be desired because the surface is not resistant to wear. In addition, it is much less resistant to the action of agents with which it comes in contact, and is not as impervious to the penetration of water as is usually desired.

We have invented a process in which a polyvinyl chloride containing a nitrogen liberating blowing agent, with or without plasticizers and stabilizers and other conventional ingredients, is mixed with a volatile plasticizer, the mixture is molded at an elevated temperature and pressure and after cooling the mold, the product is then further expanded and its dimensions stabilized by heating to a temperature to remove a large proportion of the volatile plasticizer.

The process is very easy to manipulate and lends itself to wide variations in the compounding formula as well as in the processing technique. The resulting molded product is particularly advantageous in that the outer surface has a relatively smooth, tough skin of the polyvinyl chloride which is substantially free from voids. The cells nearer the outer skin layer are smaller in size and more finely dispersed. The skin surface is smooth and dense and resistant to wear and abrasion; it resists penetration by moisture or other external agents.

This novel characteristic of the product resulting from our process may be seen from the accompanying sheet of drawings which form a part of this specification and in which the single figure illustrates a greatly enlarged cross-section of a portion of a molded object made in accordance with our invention. The main body of the interior of the molded product is shown at 1 and consists of a number of separate (non-intercommunicating) cells, more or less uniformly dispersed and of relatively large size as compared with the volume of the plastic forming the network surrounding the cells. The portion shown is only a part of the object, the bulk of it conforming to the showing in this area. Towards the surface of the molded object, as shown at 2, the cells become smaller and occupy a lesser proportionate volume so that the apparent density is greater. At the very outer surface of the object there is a layer, 3, free from cells, which is a continuous plastic film formed integrally with the plastic forming the cell walls. The manner in which this is accomplished will be explained more particularly hereinafter.

Another advantage of our invention, among other, is the ability to obtain a product having a lower density for a given amount of blowing agent and plastic. When the object is to make a light-weight material, our invention makes this possible with a minimum amount of blowing agent and plastic. For a product of a given size or volume, this represents an economy in the amount of the plastic material required. A product with a lower density is superior for many uses, such as in thermal insulation, and in articles where buoyancy is required, such as life rafts, etc.

Other advantages of our invention include a reduction in the molding and curing time, thereby reducing the length of the molding cycle, a marked facility with which products of various unusual shapes can be made, and the dependability and reproducibility of the products.

Still another advantage of the invention is the desirable life and use characteristics attributable to the properties of polyvinyl chloride in the form described. The dense surface resists the action of light, and is resistant to chemicals and deteriorative influences.

The method of our invention comprises the formation of a composition consisting essentially of three components: (1) A polyvinyl chloride; (2) a nitrogen liberating blowing agent; and (3) an ingredient which has a high degree of volatility at the curing temperature and which exerts a plasticizing or solvent action upon the plastic during curing. The nature of the latter component will be discussed in some detail hereinafter and will be referred to for convenience as a volatile plasticizer.

The polyvinyl chloride preferably should be in the form of a powder of relatively fine particle size, for example, substantially passing through a 100 mesh screen or smaller. Its molecular weight is not critical, but the higher melting polymer is preferred. Such powders are readily available on the market, for example, under the name of "Marvinol VR 10" and "Geon 121." While we prefer polyvinyl chloride as such, our invention contemplates the use of a polyvinyl chloride internally plasticized by copolymerizing it with vinyl acetate, vinyl butyrate, etc. as known in the art. Generally 8 to 9.5 mols. vinyl chloride is copolymerized with 2 to 0.5 mols. of the vinyl acetate, or other vinyl ester. The latter resins are known as "copolymer resins" but since they contain vinyl chloride as the essential ingredient which controls the primary nature of the resin and the other ingredients act to internally plasticize the polyvinyl chloride, rather than plasticizing externally by adding an ingredient in physical admixture, we regard them as included in, or equivalent to, the general class of polyvinyl chloride resins.

The blowing agent may be any compound or composition that liberates nitrogen at a temperature above room temperature at which the molding is accomplished. For example, it may be diazo amino benzene, azo isobutyric dinitrile, dinitroso pentamethylene tetramine, diethyl azo isobutyrate, 1,3-bis-(xenyl)-triazine and similar compounds.

The nitrogen liberating blowing agents are well known in the art and we do not regard any particular one as critical for the successful operation of our process. They do not necessarily react chemically with any other ingredient and their liberation of nitrogen at an elevated temperature is their known chemical mode of action.

The amount of the blowing agent based upon the polyvinyl chloride will be a function of the desired density in the product. The larger the amount of the nitrogen liberated, in general the lower will be the density of the cellular product. In general the amount will vary from 10% to 60%, depending upon the factor just mentioned, the nitrogen liberating action of the particular blowing agent and the molding temperature. In view of the known action of the nitrogen blowing agent, it is believed that one skilled in the art may select the amount desired in view of the above explanation of the functions, the mode of action and the illustrative examples which follow.

The third essential component to be used in practicing our invention is the volatile plasticizer. This may be a single ingredient or it may be a mixture of ingredients. It should be liquid at room temperature and not have such a high degree of volatility at room temperature as to preclude its use as a liquid ingredient in the mix. For most practical purposes it should not have a greater vapor pressure at room temperature (70° F.) than the vapor pressure of acetone at this temperature. It exerts two functions. It must develop a substantial vapor pressure at the curing temperature so as to have a substantial degree of volatility at this temperature, and it must have a plasticizing action on the polyvinyl chloride at this temperature. The latter action may be considered as a solvent or swelling action on the polyvinyl chloride. Materials which exert this action on the polyvinyl chloride are well known, and include the so-called polar solvents, i. e., the ketones, esters, alcohols, ether-alcohols, etc. Among them may be mentioned acetone, methylethyl ketone, dioxane, mesityl oxide, monomeric methyl methacrylate, monomeric vinyl acetate, etc. Their action is essentially a physical one as recognized in the art.

Acetone, for example, possesses both the desired plasticizing action and vapor pressure. It may be replaced in part by a component which exerts the vapor pressure but does not have a plasticizing action, such as, for example, petroleum naphtha. The volatile plasticizer, may, for instance, be composed of naphtha and dioxane, the first exerting vapor pressure and, second, exerting the solvent or swelling action. But the second component also must have the requisite volatility. A single component may serve both functions, for example methyl methacrylate has a relatively high vapor pressure at temperatures above 80° C. and also exerts the requisite plasticizing action. In addition it and similar monomers have the advantage that any material not vaporized during the curing is polymerized and does not remain in the final product as a volatile solvent for gradual evaporation.

Reference herein to a volatile plasticizer is intended to refer to a single compound or a mixture of compounds as long as the material has a vapor pressure of at least about 200 mm. of Hg at a temperature of 150° F., and preferably above 350 mm. The preferred amount of volatile plasticizer will depend somewhat on the amount of the non-volatile plasticizer, if any, the swelling action of the volatile plasticizer on the polyvinyl chloride, and other factors including the ease of mixing the ingredients. Considering the above factors the amount may vary within the range of 25% to 300%.

If the volatile plasticizer is composed in part of a volatile component not exerting any plasticizing action, such as naphtha, it may be present in an amount just above 0% up to 50% of the total volatile plasticizer.

This composition may, and often will, include a relatively non-volatile plasticizer of the kind normally used in the polyvinyl chloride molding art, dependent upon the degree of rigidity or resiliency the product is to have. Of the other ingredients which may be employed as plasticizers may be those conventional in the polyvinyl chloride molding art, such as tricresyl phosphate, dioctyl phthalate, ethylhexyl phthalate, dibutyl sebacate, methyl abietate, triphenyl phosphate and similar compounds. If a plasticizer is used it exerts its well known function of permitting increased elongation before breaking of the product under tensile stress. If a non-volatile plasticizer is included as an ingredient, the amount may vary depending upon the resiliency in the molded product. The amount will vary from just above 0% up to 150%, based on the polyvinyl chloride content. Large amounts give a very soft, resilient product and no plasticizer gives a product which is quite rigid.

In addition the composition may and usually will include light and heat stabilizers. Any conventional heat stabilizing agent may be included, such as basic lead carbonate or silicate, and any conventional light stabilizing agent may be employed, such as the phosphate and metal-organic compounds, in the amounts conventional in the art.

Lubricants, such as stearic acid and metal stearates may be included to facilitate release from the mold. Waxes are also used. Surface active or emulsifying agent may be included to facilitate wetting and mixing of the in-ingredients, all as known in the art. The composition will usually include pigments, dyes, and fillers in amounts conventional in the polyvinyl chloride molding art. These ingredients serve their known purpose and do not modify the manner in which the desirable results of the invention are achieved. They are not regarded, therefore, as components essential for practice of the invention, but would usually be included as components to give products having optimum commercial properties.

Other ingredients may be employed to modify the action of the blowing agent, i. e., to alter the temperature at which the blowing agent decomposes or otherwise affects its activity.

The composition may include other resin forming ingredients, generally in the form of a monomer, or partial condensate, or low molecular weight polymer and some or all of such material may be polymerized to modify somewhat the final properties of the expanded polyvinyl chloride product.

While the essential and major resin contained in the composition of our invention is the polyvinyl chloride, this is not to exclude the presence of other resins which may be present in the final composition as a result of addition of monomers or polymers to the mixture before molding and curing, for example, ureaformaldehyde, polyalkyd resins, acrylic esters, styrene and the so-called "polyester resins" which are present in a minor proportion of the resin component, generally an amount within the range of 25% to 40% of the resinous component in the final composition. None of the above is considered an essential ingredient. The expression "consisting essentially of" is not intended to exclude components such as those described above or other which do not interfere with the accomplishment of the objects and advantages of the invention as described herein.

In practicing the invention, the ingredients may be mixed together in any order. Preferably the dry ingredients, i. e., the polyvinyl chloride and the blowing agent, together with any stabilizers, pigments, etc., are thoroughly mixed. To these are added the (non-volatile) plasticizer if any is to be used, and the volatile plasticizer. The material is thoroughly mixed into the form of an organosol. For example, polyvinyl chloride and the other dry ingredients may be mixed with tricresyl phosphate, or dioctyl phthalate, in an amount to form a heavy putty-like material. If the volatile plasticizer is a mixture of equal parts of petroleum naphtha and acetone, this may be added and the mixture will take on a consistency all the way from a heavy putty to a heavy syrupy consistency, depending upon the proportions. The effect of the naphtha and acetone can readily be noticed if the petroleum naphtha is first added. This thins the mixture because the petroleum naphtha does not exert any plasticizing or swelling action on the resin. When the acetone is added the mixture thickens due to the plasticizing or swelling action of the acetone on the polyvinyl chloride.

While the preferred mixing procedure is as described above, one or more of the dry ingredients may be mixed with the liquid ingredients and then the remainder of the dry ingredients added. There is no criticality to the order of mixing so long as the ingredients are finally formed into a homogeneous mixture.

The mixture procedure is essentially the same irrespective of the components. For instance, if styrene monomer is to be included this may be mixed with acetone, or if methyl methacrylate is to be included this may be mixed with or without acetone or other volatile plasticizer. The composition is then placed into a mold of the desired configuration. The mold should be tight in order to prevent any ingredients from escaping during the heat molding step in so far as this is possible. The composition is placed in the mold, generally sufficient to fill it, or somewhat less depending upon the proportions of the ingredients, especially the blowing agent, and the density of the final product. The mold is closed and heated to a temperature at which the blowing agent liberates nitrogen. The temperature generally will be from 200° F. to 350° F., the mold may be heated by a liquid or gas, such as hot water or steam or by electricity. During the heat molding, the organosol reverses phase and forms a continuous resin with the plasticizers in the internal phase. The mold must be able to withstand the tremendous pressure (in the general range of 1 to 5 tons per sq. in.) which is generated by the blowing agent and by the volatile plasticizer, only a small portion, if any, of the latter being liberated at this stage due to the confining characteristics of the mold. The molding time is not long and may vary from 1 minute to 1 hour, depending somewhat on the size of the object being molded. Generally the minimum time required is that which will evenly heat the mixture to the molding temperature. During heat molding operation the nitrogen blowing agent liberates nitrogen which becomes entrapped in a number of cells under pressure, each of which is surrounded by the plastic so that the cells are not interconnecting. The mold is then cooled, generally by running cold water over it before being opened. At the cooled temperature the plastic has sufficient strength to sustain the pressure developed within it. Upon opening the mold the product expands.

The exact function of the volatile plasticizer is not fully understood, but it appears to migrate towards the surface of the mold at some time, perhaps during the moment when the mold is cooled. In any event, the presence of this volatile plasticizer is instrumental in forming the tough, cell-free plastic film which is connected integrally with the internal cellular structure. While we do not intend to be limited to any theory of operation, we have demonstrated that in the absence of the volatile plasticizer the skin formation is not satisfactory for our purposes.

After the product is removed from the mold it is heated, such as in an oven, generally at atmospheric pressure, and heated to permit the volatile plasticizer to evaporate. A temperature within the range of 150° F. to 250° F. may be employed, depending largely on the plasticity of the product and the volatility of the volatile plasticizer. The heating time may be 10 minutes to a number of days, depending on the size of the molded product, the volatility of the plasticizer and the temperature. During this action the dimensions of the product are stabilized and the final expanded volume is obtained. The product expands considerably during the heat-curing. During this operation the exact action taking place is not fully understood, but it is believed that the volatile plasticizer has a softening effect so that the product initially can expand. After it reaches its maximum dimensions and the volatile plasticizer has evaporated, it is believed that the product is unable to return to its original dimension, i. e., in the absence of the volatile plasticizer the polyvinyl chloride will not be sufficiently plastic to return to its original position. It is desirable to eliminate at least 75% and preferably as much of the volatile plasticizer as possible during the curing. Thus the volatile plasticizer not only has the desirable function of imparting an impervious skin to the product during the molding, but at the same time permits a stabilization in size and an increase in volume.

Without the volatile plasticizer, the material would have the same elasticity at all times. It would contract as much upon cooling as it would expand upon heating. However, the plastic with the volatile plasticizer expands upon heating because it is in a soft elastic stage due to the plasticizer, but when it would tend to retract upon cooling it is a less elastic material due to the evaporation of the plasticizer during the curing. As illustrative of this explanation, for example, if the volume of the mold is considered as 100%, the product coming from the mold will have a volume of 125% to 150%. If it did not have the volatile plasticizer it might expand to 200% during curing and retract to a maximum 150% after curing. With the volatile plasticizer as an ingredient, however, the composition, otherwise the same, would expand to 250% or perhaps more during curing because it is softer at this stage, and upon cooling might retract to 200%, a net gain of at least 50% in volume due to the presence of a volatile plasticizer.

The products may be molded into a variety of shapes and used for a variety of purposes. For example, they may be used as inserts for liners in life jackets. In such cases the product is relatively elastic, somewhat similar to the elasticity of ordinary sponge rubber. This is accomplished by employing a large amount of a (non-volatile) plasticizer. The product may be molded into a doughnut-shaped life preserver. In this instance, the product has very little plasticizer so as to have substantial rigidity and shape-retaining properties. It may be molded in sheet form for use as thermal insulation for building purposes, or in the form of a container such as one suitable for ice-cubes. The products may be molded into various sizes. For instance, products in the general shape of logs as large as one foot in diameter and some ten feet long may be made for use in construction of life rafts.

The following general example illustrates the compositions which may be made in accordance with the invention:

| | Parts by weight |
|---|---|
| Polyvinyl chloride | 100 |
| Nitrogen liberating blowing agent | 10–60 |
| Volatile plasticizer | 25–300 |
| Heat stabilizer, such as basic lead silicate | 0–20 |
| Light stabilizer, such as a barium-sodium organic complex | 0–10 |
| Non-volatile plasticizers, such as dioctyl phthalate or tricresyl phosphate | 0–150 |
| Pigments and fillers | 0–20 |
| Accelerator for blowing agent | 0–20 |
| Resinous monomer or low polymer, or solution thereof, (other than volatile plasticizer) | 0–45 |
| Other ingredients, such as lubricants, wetting agents, etc. | 0–15 |

The following examples illustrate our invention:

Example 1

A composition is made by mixing the following materials together until uniformity is obtained.

| | Parts by weight |
|---|---|
| Powdered polyvinyl chloride | 100 |
| Azo isobutyric dinitrile | 45 |
| Tricresyl phosphate | 80 |
| Acetone | 90 |

The composition is then transferred to a mold having dimensions of about ½" x 12" x 12", and sufficient of the composition is placed in the mold to substantially fill it. The mold is closed and heated for ten minutes by steam at a pressure of approximately 50 lbs. per sq. in. The mold is then cooled with cold water. The mold is opened and the product upon being released from the mold has a dimension of approximately ¾" x 16" x 16". It is then placed in an oven and heated to a temperature of about 150° F. for about one hour, during which time most of the acetone is evaporated. Upon removing the product from the oven it is permitted to cool to room temperature and its dimensions will be found to have been stabilized to about 1" x 20" x 20".

*Example 2*

The following example illustrates an embodiment of the invention in which various stabilizers, plasticizers and other ingredients are included in accordance with well known practices in the molding art, to give a product having optimum physical and chemical properties.

| | Parts by weight |
|---|---|
| Powdered polyvinyl chloride | 100 |
| Dinitroso pentamethylene tetramine | 30 |
| Petroleum naphtha | 30 |
| Acetone | 70 |
| Basic lead silicate | 12 |
| Light stabilizer | 3 |
| Dioctyl phthalate | 30 |
| Tricresyl phosphate | 30 |
| Phthalic anhydride (blowing agent accelerator) | 15 |
| Colored pigment | 3 |
| Zinc stearate | 5 |

The ingredients are mixed together and processed in accordance with Example 1.

*Example 3*

| | Parts by weight |
|---|---|
| Powdered polyvinyl chloride | 100 |
| Dinitroso pentamethylene tetramine | 30 |
| Naphtha | 30 |
| Acetone | 75 |
| Basic lead silicate | 12 |
| Light stabilizer | 3 |
| Zinc stearate | 5 |
| Powdered acrylonitrile-butadiene copolymer | 5 |
| Salicylic acid | 15 |
| Saturated polyester glycol plasticizer | 20 |
| Tricresyl phosphate | 10 |
| Dioctyl phthalate | 10 |

The ingredients are mixed together and placed in a cylindrical mold having a diameter of about 6¼ in. and a length of about 5 ft. The composition is heated to a temperature of 300° F. for 40 minutes, following which the mold is cooled to room temperature and opened. The molded object is then heated in an oven for 48 hours at 180° F. and has a final diameter of about 13 in. and a length of about 10 ft. The surface comprises a heavy, tough polyvinyl plastic film, and the product is extremely resistant to wear and penetration by water. The products so molded have a density of about 4½ lbs. per cu. ft. and are suitable for the construction of a life raft.

*Example 4*

| | Parts by weight |
|---|---|
| Powdered polyvinyl chloride | 100 |
| Azoisobutyric dinitrile | 40 |
| Methyl methacrylate | 300 |
| Basic lead silicate | 12 |
| Light stabilizer | 3 |

The components are mixed together in the manner described in connection with Example 1, and processed following the same general technique. This example illustrates the use of a monomer as the volatile plasticizer. A large portion of the monomer evaporates during the curing stage, but that which does not evaporate polymerizes during the curing so that the final product is free from any volatile ingredient. The product has a finished density of about 3 to 4 pounds per cubic foot.

*Example 5*

| | Parts by weight |
|---|---|
| Powdered polyvinyl chloride | 100 |
| Dinitroso pentamethylene tetramine | 30 |
| Phthalic anhydride | 15 |
| Diotyl phthalate | 30 |
| Naptha | 30 |
| Dioxane | 60 |
| Styrene | 60 |

This example is processed in accordance with Example 1 except that a curing temperature of about 200° F. is used in view of the higher boiling point of the dioxane. The example illustrates the use of a monomer which has a higher boiling point and a relatively large portion of which, therefore polymerizes during molding and curing to modify the final properties of the product.

*Example 6*

Example 5 is repeated, except that in place of the styrene there is substituted a 55% solution of monomeric urea and formaldehyde concentrate in butanol.

*Example 7*

| | Parts by weight |
|---|---|
| Powdered polyvinyl chloride | 100 |
| Dinitroso pentamethylene tetramine | 30 |
| Salicylic acid | 15 |
| Toluol | 30 |
| Methylethyl ketone | 110 |
| Basic lead silicate | 12 |
| Light stabilizer | 3 |
| Zinc stearate | 5 |

The composition is mixed together and transferred to a mold having dimensions of about ½" x 6" x 6". The mold is closed and heated for about 5 minutes by steam at a pressure of approximately 50 lbs. per sq. in. The product upon being released from the mold has dimensions of about ⅞" x 11" x 11". It is then placed in an oven and heated for 48 hours at a temperature of 180° F. The finished product has dimensions of about ¼" x 15" x 15" and a density of 2 to 3 lbs. per cu. ft. Despite the very low density of the product, it is quite hard and rigid due to the absence of any permanent plasticizer.

The products of all of the above examples have the characteristic skin formation described heretofore.

It will be obvious in view of the above illustrative examples and the general description of our invention heretofore, that other formulations may be compounded utilizing our invention, depending upon the availability of raw materials and the views of the plastic molder or engineer as to what constitutes optimum plastic formulations, considering the final properties desired in the product. All such compositions must include the essential components of our invention, more particularly a polyvinyl chloride, a blowing agent and the volatile plasticizer. Such other embodiments will appear from a consideration of the generic disclosure of our invention and the following claims.

We claim:

1. A process of making an expanded polyvinyl chloride product which comprises mixing together ingredients consisting essentially of a plastic in powdered form having polyvinyl chloride as the primary and essential ingredient, a blowing agent liberating nitrogen at an elevated molding temperature, and a volatile plasticizer, placing the mixture in a mold in an amount sufficient to substantially fill the mold, molding the mixture in a closed mold by heating at an elevated molding temperature under pressure to liberate the nitrogen from the blowing agent and to transform the resin into a continuous phase, cooling the molded product to impart the general shape of the mold to the product, releasing the pressure, removing the molded product from the mold whereupon the product undergoes partial expansion, and curing and further expanding the product by heating at an elevated temperature whereby the dimensions of the product are stabilized, the volatile plasticizer exerting a plasticizing action upon the polyvinyl chloride at the curing temperature and having a sufficiently high vapor pressure so that a major portion volatilizes during the curing.

2. The process of claim 1 in which the volatile plasticizer comprises a ketone volatile at the curing temperature.

3. A process of claim 1 in which the volatile plasticizer is a mixture of acetone and petroleum naptha.

4. A process of claim 1 in which the volatile plasticizer comprises a compound having said plasticizing action and volatility at the curing temperature and being polymerizable into a resinous component.

5. The process of claim 4 in which the compound is methyl methacrylate.

6. The process of claim 1 in which the composition also includes styrene as a relatively non-volatile monomer polymerizable in the final product during molding and curing.

7. The process of claim 1 in which the composition also includes a non-volatile plasticizer.

8. The process of claim 7 in which the non-volatile plasticizer is tricresyl phosphate.

References Cited in the file of this patent

UNITED STATES PATENTS

| | | |
|---|---|---|
| 2,427,513 | Spessard | Sept. 16, 1947 |
| 2,498,074 | Feldman | Feb. 21, 1950 |
| 2,548,438 | McLoughlin | Apr. 10, 1951 |

FOREIGN PATENTS

| | | |
|---|---|---|
| 429,316 | Great Britain | May 28, 1935 |
| 578,513 | Great Britain | July 2, 1946 |

OTHER REFERENCES

Burleson: Plastics (of Chicago) Aug. 1947, pages 18, 21, 24 and 25.